(12) United States Patent
Sportel et al.

(10) Patent No.: US 6,565,733 B1
(45) Date of Patent: *May 20, 2003

(54) METHOD AND APPARATUS FOR THE PRODUCTION OF ALUMINIUM

(75) Inventors: Heiko Sportel, Uitgeest (NL); Cornelis Wilhelmus Franciscus Verstraten, Amsterdam (NL)

(73) Assignee: Corus Aluminium Walzprodukte GmbH, Koblenz (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/465,692

(22) Filed: Dec. 17, 1999

Related U.S. Application Data
(60) Provisional application No. 60/130,710, filed on Apr. 22, 1999.

(30) Foreign Application Priority Data

Dec. 18, 1998 (EP) .............................. 98204307

(51) Int. Cl.⁷ .............................. C25C 3/00; C25C 3/06; C21B 11/10; C01F 17/32
(52) U.S. Cl. .................. 205/372; 204/243.1; 75/10.62; 75/673; 423/561.1
(58) Field of Search .................. 423/561.1; 75/673, 75/10.62; 205/372–396

(56) References Cited

U.S. PATENT DOCUMENTS

| | | |
|---|---|---|
| 1,816,842 A | 8/1931 | Haglund |
| 1,941,610 A | 1/1934 | Macready |
| 2,400,000 A | 5/1946 | Gardner |
| 4,133,727 A | 1/1979 | Rogers, Jr. |
| 4,252,774 A * | 2/1981 | Loutfy et al. ................. 423/76 |
| 4,265,716 A | 5/1981 | Loutfy et al. |

FOREIGN PATENT DOCUMENTS

| | | |
|---|---|---|
| DE | 41891 | 1/1888 |
| DE | 79781 | 2/1895 |
| GB | 484014 | 4/1938 |
| GB | 1483193 | 8/1977 |

OTHER PUBLICATIONS

Fathi Habashi: "Handbook of Extractive Metallurgy" 1997, Wiley Vch, Weinheim, DE XP002136024 vol. II; Chapter 21: Aluminum Section 21.10.1.5: Metallurgical Alumina, pp. 1094–1095 & p. 1067, figure 21.20.

Database Compendex Online! Elsevier Adsorpt. Science and Technol., Apr. 1984 Arean C. Otero: "Effect of calcination on structure and texture of gamma–alumina" XP002136025 abstract.

* cited by examiner

Primary Examiner—Donald R. Valentine
(74) Attorney, Agent, or Firm—Stevens, Davis, Miller & Mosher, LLP

(57) ABSTRACT

Method for the production of primary aluminium from alumina comprising the step of converting alumina into aluminium sulfide ($Al_2S_3$) and subsequently the separation of aluminium from aluminium sulfide wherein the conversion of alumina into aluminium sulfide is performed by reacting alumina with $CS_2$ containing gas at a temperature $T_{al}$ whereby the alumina is mainly γ-alumina.

31 Claims, 2 Drawing Sheets

METHOD AND APPARATUS FOR THE PRODUCTION OF ALUMINIUM

This application claims priority from U.S. Provisional Application No. 60/130,710, filed Apr. 22, 1999.

FIELD OF THE INVENTION

The invention relates to a method for the production of primary aluminium from alumina ore and to an apparatus for performing the method.

BACKGROUND OF THE INVENTION

The most commonly used method for the production of liquid aluminium from alumina ore is the Hall-Heroult process in which, through electrolysis alumina is decomposed. In this process alumina is continuously fed and dissolved in a bath comprising liquid aluminium and molten cryolite, a mineral comprising fluorides of sodium, aluminium and calcium. A carbon anode is supplied in the bath of molten cryolite and aluminium. The cell containing the bath, is internally coated with lining of a conductive layer facing the inside and acting as a cathode. Liquid aluminium is formed at the cathode and collected on the bottom of the cell. From there it is periodically removed.

The Hall-Heroult process has a number of drawbacks. One drawback is the high, electrical, energy consumption. Another drawback is the emission of fluorides such as $CF_4$ and $C_2F_6$ which are considered notorious green house gases, the emission of CO and of heavy metals. Also, the used lining of the cell, known as spent pot lining, is an environmentally unfriendly residu of the Hall-Heroult process. The Hall-Heroult process requires, for a practical production capacity, a large number of cells which together occupy a large area.

Already more than one hundred years ago an alternative process using aluminiumsulfide has been investigated. The investigation has been taken up again in the 1980s, however without success and the process was not pursued further at the time.

U.S. Pat. No. 4,265,716 discloses an embodiment of the aluminiumsulfide based process. In this document it is proposed to react, at a temperature between 1300 K and 1500 K alumina, carbon and sulfur-containing gas to form aluminiumsulfide and carbonmonoxyde. The sulfur containing gas may include sulfur in one or more of several forms, including $S_2$, $S_6$ and $CS_2$. Further it is mentioned that when the gas includes carbon as in $CS_2$, it can replace at least a portion of the carbon otherwise introduced as coke or other solids. U.S. Pat. No. 4,265,716 aims at obtaining molten aluminiumsulfide. The molten aluminiumsulfide is then heated to a temperature of about 1600 K to 1800 K and held there for a sufficient time, about 15 to 60 minutes to cause decomposition to molten AlS and sulfur gas. The molten AlS is then cooled to a temperature sufficient to cause its disproportionation to aluminium and motlen aluminium. This disproportionation is performed in the temperature range of 1200–1370 K.

SUMMARY OF THE INVENTION

Although the invention U.S. Pat. No. 4,265,716 was published in 1981, the disclosed process has not been put into practice despite the potential advantages of the aluminiumsulfide process. Obviously, in the field of the production of aluminium from alumina, it had turned out that the proposed process was not feasible. Indeed, tester performed by the present inventors have confirmed this. Surprisingly, it was found that the aluminiumsulfide process wherein use is made of $Al_2S_3$ can be performed in a new and inventive manner that is practicable and with which all the advantages as pursued in U.S. Pat. No. 4,265,716 are obtained. Besides, additional advantages over U.S. Pat. No. 4,265,716 are obtained.

These advantages are obtained with a method wherein the conversion of alumina into aluminiumsulfide is performed by reacting alumina with $CS_2$ containing gas at a temperature $T_{2l}$ whereby the alumina is mainly $\gamma$-alumina like the current alumina used for the Hall Heroult process.

It was found that, different from what was proposed in the prior art the reaction rate of $\gamma$-$Al_2O_3$ and $CS_2$ is very high compared to the reaction rate between $\alpha$-$Al_2O_3$ and $CS_2$. Therefore, the method of our invention has the possibility to yield practical quantities of $Al_2S_3$, within a practical time frame. The method of the invention is based on the following net reaction:

$$2Al_2O_3 + 6CS_2 \rightarrow 2Al_2S_3 + 6CO + 3S_2 \qquad (1)$$

COS can be formed as a by-product.

Tests have shown that the transformation from $\gamma$-$Al_2O_3$ to $\alpha$-$Al_2O_3$ takes place in a rather wide temperature range. Therefore, the reaction temperature at which $Al_2O_3$ is converted into $Al_2S_3$ can be chosen within a wide range depending on other parameters.

In practice it is preferred that the temperature $T_{al}$ is lower than 1100° C., preferably lower than 1025° C. more preferably lower than 1000° C.

At temperatures above 1100° C. all $Al_2O_3$ transforms quickly into $\alpha$-$Al_2O_3$. The reaction rate of $\alpha$-$Al_2O_3$ into $Al_2S_3$ by means of $CS_2$ proved to be very slow in our experience. Therefore, it is preferred to perform the method according to the invention at a temperature $T_{al}$ lower than 1025° C., more preferably lower than 1000° C. In particular above about 1000° C. the transformation from $\gamma$-$Al_2O_3$ to $\alpha$-$Al_2O_3$ progresses very fast. In practice, this means that a substantial portion of the $\gamma$-$Al_2O_3$ has transformed to $\alpha$-$Al_2O_3$ before sufficient $Al_2S_3$ has been formed. By operating at a temperature below 1000° C., a substantial quantity of $Al_2S_3$ can be formed before an imparing quantity of $\alpha$-$Al_2O_3$ has developed. The conversion of $Al_2O_3$ to $Al_2S_3$ by means of reaction with $CS_2$ is also called sulfidation.

Because the method of the invention is performed at substantial lower temperatures than known in the prior art, a considerable reduction in energy consumption can be achieved. Furthermore, in the method of our invention solid $Al_2S_3$ is formed, whereas in the prior art method molten $Al_2S_3$ is formed. Therefore, also our method consumes less energy since the melting heat of the formed $Al_2S_3$ is saved.

Preferably the temperature $T_{al}$ is higher than 700° C., preferably higher than 750° C. Under 700° C. the reaction rate is too low for industrial application.

It is preferred that the conversion of alumina into aluminiumsulfide is performed at a conversion pressure higher than 1 Bar absolute pressure.

Tests have shown that the reaction according to equation (1) progresses faster when it is performed at a conversion pressure higher than 1 Bar, which equals about 1 atmosphere. The reaction rate can further be increased with a further embodiment of the invention which is characterised in that the conversion pressure is higher than 5 Bar, preferably higher than 15 Bar. It has shown that, within practical limits, the reaction rate increases with increasing conversion pressure. Therefore, the conversion pressure is selected at a practical optimum, taking into account such parameters as availibility and costs of construction materials for reaction vessels, yield per unit of time and costs and efforts of safety measures.

As mentioned before in the method of our invention, solid $Al_2S_3$ is formed. In practice, it may show that the shape of the particles of the bulk $Al_2S_3$ is not very suitable for further processing. Therefore, another embodiment of the method of the invention is characterised in that the aluminiumsulfide is at least partly heated to a temperature over its melting temperature. Although the advantage of less energy consumption is reduced, this embodiment has the advantage that $Al_2S_3$ is available in a reproducible form, suitable for further processing as will be discussed later.

In the event that molten $Al_2S_3$ is not needed or wanted at that stage, a further embodiment of the invention is characterised in that the molten aluminiumsulfide is cooled so as to form small-sized grains, having average grain size smaller than the average grain size of the aluminiumsulfide prior to being heated. This embodiment yields $Al_2S_3$ in a form that is easy to handle. Further, this embodiment does not reduce the advantage of the energy consumption essentially since solidification heat can easily be regained. In one possible embodiment the $Al_2S_3$ particles formed in the sulfidation are slightly raised in temperature whereby the outer surface of the $Al_2S_3$ particles melt. The surface tension causes small-sized densified $Al_2S_3$ droplets or particles to develop. Subsequently, these densified $Al_2S_3$ droplets or particles are conveyed to a colder part of the reactor e.g. the zone where the sulfidation is taking place, in which the sulfidation takes place, and solidify there. Such densified $Al_2S_3$ particles are easy to handle for further processing.

In the sulfidation process $CS_2$ is used as a reactant. Preferably the $CS_2$ is formed from sulfur and a carbonaceous reactant. As carbonaceous reactant, coal, coke, waste materials from the petrochemical industry or waste plastics can be used.

In a preferred embodiment the carbonaceous reactant comprises, preferably contains mainly, methane or natural gas. Methane, in particular in the form of natural gas is available in large quantities and it has the advantage that the production of $CS_2$ can take place with both reactants $CH_4$ and $S_2$ in the gas phase.

Carbondisulfide ($CS_2$) is preferably produced from natural gas and sulfur gas according to the following reaction $$CH_4+2S_2 \rightarrow CS_2+2H_2S \qquad (2)$$

This gas phase reaction is carried out in the temperature window 550–650° C. and reaches a conversion of 100%. The reaction is endothermic at these temperature levels and theoretically consumes 1950 kj per kg $CS_2$ when reactants are at 25° C. and products at 750° C. Most of the heat input goes into dissociation of sulfur vapor to the reactive species $S_2$. In practice 3000 kj per kg $CS_2$ are needed.

World-wide production quantity is about 1.100.000 tonnes a year of which 60% is used in the viscose and rayon industry, and 25% for the production of cellophane and carbontetrachloride. Production volume of $CS_2$ is dropping because cellophane is replaced by other plastic films, carbontetrachloride usage also dropped dramatically because its use as refrigerant and aerosol propellant is driven back. $CS_2$ mixed with air is an explosive mixture over a wide range of concentrations. Together with the low ignition temperature closed installations working above atmospheric pressure to eliminate leaking in of air (oxygen) are used mostly. All equipment containing $CS_2$ must be located well away from potential sources of ignition such as open flames, frictional heat, sparks, electrical light bulbs and bare steam pipes. In practice however only installation working with liquid $CS_2$ have to be protected in such a way. Leakage from hot installation parts will not result in dangerous $CS_2$ clouds but in small flames where $CS_2$ reacts with oxygen to $CO_2$ and $SO_2$, thus eliminating danger of explosion.

In the production of $CS_2$ in accordance with equation (2) also $H_2S$ is produced. A preferred embodiment of the method of the invention is characterised in that hydrogensulfide ($H_2S$) formed in the production of $CS_2$ is removed and converted to form sulfur which sulfur is returned for the production of $CS_2$. The produced $H_2S$ can be subjected to the following reaction:

$$3H_2S+1,5O_2 \rightarrow 3S+3H_2O \qquad (3)$$

The sulfur can be re-used for the production of $CS_2$. In this manner the supply of make-up sulfur can be reduced.

Another preferred embodiment is characterized in that unreacted sulfur in the production of $CS_2$ is removed, preferably by condensation, and returned for the production of $CS_2$. In this way, the $CS_2$ is purified and sulfur is re-used and less sulfur needs to be supplied from external sources.

Yet another embodiment of the method of the invention is characterised in that the $CS_2$ used is formed essentially from sulfur of which the mainstream result from the separation of the aluminiumsulfide into aluminium and/or sulfur from the conversion of alumina into aluminiumsulfide. In this embodiment, practically all sulfur used in the conversion of $Al_2O_3$ into Al and by-products, is re-used and only small amounts that inevitably are lost, need to be supplied from external sources.

The invention is also embodied in a method in which prior to the conversion of alumina into aluminiumsulfide (sulfidation) the alumina is dried and pressurised, whereupon the sulfidation is performed by passing a gas-solid mixture containing gaseous $CS_2$ and solid alumina through a reactor at a temperature of preferably between 800° C. and 900° C. and at a pressure of preferably between 5 and 35 Bar, whereupon the solids are separated and the gas is further treated for separating unreacted $CS_2$ and by-products such as CO, COS and $S_2$, at least one of which is fed back into the process for the production of $CS_2$. In this method the sulfidation is performed in a preferred temperature and pressure range, taking into consideration constructional parameters, energy consumption and unavoidable side reactions. By-products are to a larger extent re-used in the process.

An embodiment of the invention that is particularly advantageous, is characterised in that the $CS_2$ containing gas is formed and essentially fed directly, without essential intermediate storage, to a reactor vessel to react with alumina to form aluminiumsulfide. According to this embodiment it is proposed to integrate the production of $Al_2S_3$ with the sulfidation and not to acquire $CS_2$ from remote production facilities.

Integrating $CS_2$ production with aluminium production in particular with the sulfidation therein has the following advantages:

No provisions have to be made to store and distribute liquid $CS_2$. Only a $CS_2$ storage tank is needed for start-up.

Further no provision have to be made to receive and store large quantities of liquid sulfur while the sulfur in this process can be recycled for nearly completely in accordance with other preferred embodiments.

The final step in the $CS_2$ process is normally a destillation to remove $H_2S$ from the liquid $CS_2$ to obtain a 99.9% pure liquid $CS_2$. This step can be optionally omitted while $H_2S$ will have no negative effect on the sulfidation process.

A totally different reactor design can be applied for the production of $CS_2$ from methane or natural gas and sulfur. Generation of hot sulfur gas in the electrolysis of $Al_2S_3$ eliminates the need to vaporize sulfur in the $CS_2$ reactor. In the new reactor design the temperature may be chosen higher, making the reaction of methane or natural gas and sulfur exothermic instead of endothermic. This will have the additional advantage in eliminating the use of methane or natural gas as a fuel in the $CS_2$-reactor.

The off-gas of the sulfidation reactors contains unreacted $CS_2$, $S_2$ and CO. This gas can be cleaned in the gas cleaning section of the $CS_2$ plant. The CO can eventually be fed into the combustion chamber of a Claus unit for the production of sulfur, where it is burned to $CO_2$ and will attribute to the production of super heated high pressure steam in the Claus waste heat exchanger.

Preferably the $CS_2$ containing gas is essentially $CS_2$. It is not necessary, for the sulfidation, to use essentially $CS_2$ as $CS_2$ containing gas. However, to avoid possible side reactions and to save energy it is preferred to use essentially $CS_2$ as $CS_2$-containing gas.

From the $Al_2S_3$, produced in the sulfidation, metallic aluminium is to be made. In a preferred embodiment the separation of aluminium from aluminiumsulfide is performed by electrolysis.

As discussed above, the Hall-Heroult process, in which molten metallic aluminium is made through electrolysis, has many drawbacks.

In the 1980's experiments were conducted directed to the production of aluminium in a chloride process in which aluminiumchloride was produced and subsequently subjected to electrolysis. The chloride process was abandoned in 1985. One of the main reasons being the inevitable production of environmentally hazardous chlorinated hydrocarbons during the production of aluminiumchloride. This would lead the skilled person away from applying electrolysis for the separation of Al from $Al_2S_3$.

However the inventors have realised that the electrolysis process as developed for the aluminiumchloride-based process can advantageously be further developed for application in the aluminiumsulfide-based process. The electrolysis of aluminiumsulfide is a further development of the electrolysis of aluminiumchloride. Similar advantages over the Hall-Heroult process exist, whereas the disadvantages can be less because of the less aggressive nature of sulfur containing gases in comparison to chloride containing gases. Also spent materials like refractory can be treated more easily to obtain environmentally safe waste products. The spent pot lining from the present process will only contain sulfur and chlorides, but will be essentially free from fluorides and cyanides.

Also the working conditions around the electrolysis cell will be better because the electrolysis cells should be closed to prevent air leaking in and causing oxidation of the $Al_2S_3$.

A further embodiment of the method of the invention is characterised in that the electrolysis is performed in a multi-polar electrolysis cell.

The multi-polar cell has the advantage that the voltage drop in the electrolysis process can be reduced due to a low resistance of the cell. Such cell is known e.g. from U.S. Pat. No. 4,133,727.

Still a further embodiment of the method of the invention is characterised in that the electrolysis is performed directly in a bath of molten aluminiumsulfide.

As an alternative liquid $Al_2S_3$ can be electrolysed directly ($Al_2S_3$ being the most abundant single component in the melt) with only very small amounts and preferably no external addition of salts to the melt, with or without the use of membranes. The most important advantage of this embodiment is that small inter-electrode space is possible (no lack of feedstock between the electrodes).

The invention is also embodied in an apparatus comprising a first reactor for the manufacture of $CS_2$, a second reactor for the manufacture of $Al_2S_3$ from $CS_2$ and $Al_2O_3$ and a third reactor for the manufacture of Al from $Al_2S_3$ said third reactor preferably being an electrolysis cell. Such apparatus has the advantage that the $CS_2$ production is integrated with other process steps for the production of aluminium from alumina and that intermediate products need to be conveyed over short distances. This is of particular advantage where intermediate products are aggressive or at high temperature.

The process of the invention is also referred to as the Compact Aluminium Production Process or CAPP, the key feature of this process, being the conversion of aluminiumoxide (alumina) to aluminiumsulfide, which can be converted into sulfur (gas) and aluminium preferably through electrolysis.

BRIEF DESCRIPTION OF THE DRAWINGS

The invention will now be illustrated in more detail with reference to a non-limiting embodiment according to the drawing in which.

DETAILED DESCRIPTION OF THE PREFERRED EMBODIMENTS

Figure 1:
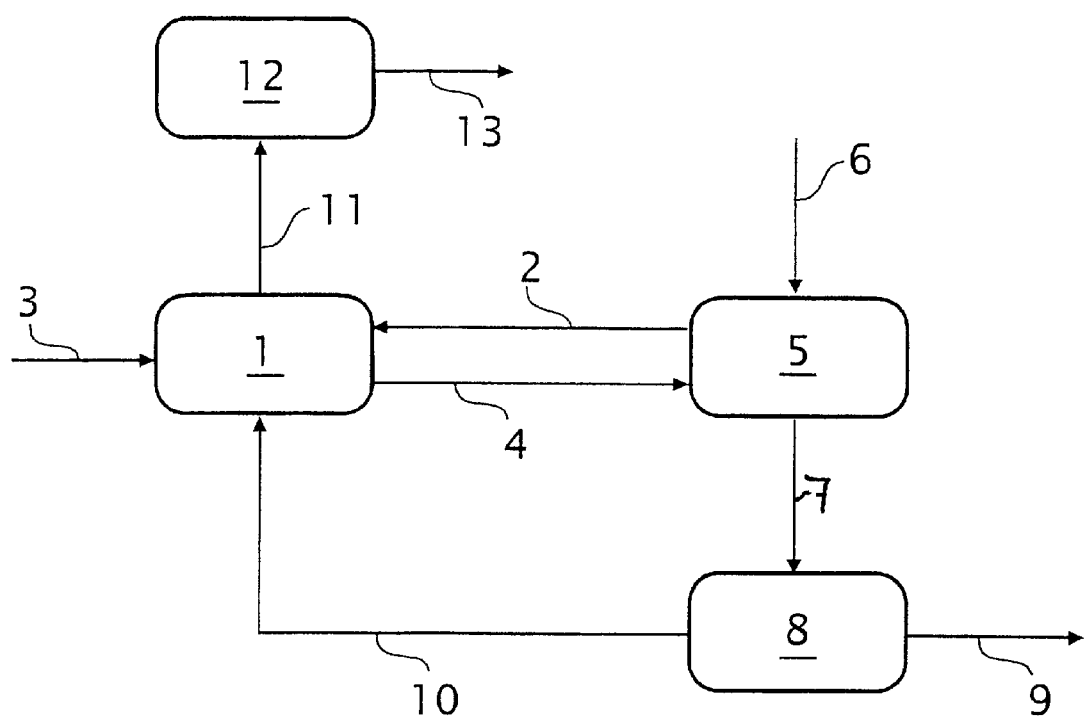
FIG. 1 shows a general block-scheme, illustrating the interconnection between the main processes of the method of the invention.

In FIG. 1 a simplified block-scheme of the main process steps and their interconnection is shown.

The main two basic unit operations of the process of the invention are:
- the production of aluminiumsulfide ($Al_2S_3$) from $Al_2O_3$ using sulfur containing gases;
- the production of aluminium from $Al_2S_3$ preferably by means of electrolysis. Alternatively a disproportionation mechanism may be used as proposed in U.S. Pat. No. 4,265,716.

The main reactions that take place are:

$$CH_4 + 2\ S_2 \rightarrow CS_2 + 2H_2S \qquad (4)$$

$$3H_2S + 1{,}5\ O_2 \rightarrow 3S + 3\ H_2O \qquad (3)$$

Instead of $CH_4$, other carbonaceous materials, such as wood, oil or coal may be used.

Another main reaction is the formation of aluminiumsulfide or sulfidation:

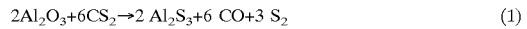
$$2Al_2O_3 + 6CS_2 \rightarrow 2\ Al_2S_3 + 6\ CO + 3\ S_2 \qquad (1)$$

$$\text{or}\ Al_2O_3 + 3\ CS_2 \rightarrow Al_2S_3 + 3\ COS \qquad (1b)$$

This process is preferably performed in the range 700–1100° C. and 1–40 Bar, more preferably in the range 750–1000° C. and 5–35 Bar. Typically a temperature $T_{al}$ of 850° C. and 30 Bar is applied in case solid $Al_2S_3$ is wanted.

In the event liquid or gas $Al_2S_3$ is wanted as feed for the next process step, an appropriate temperature and pressure range can be selected or the formed $Al_2S_3$ can be reheated. Preferably the sulfidation is carried out using essentially only $CS_2$ to react with $Al_2O_3$. Preferably $Al_2O_3$ in powder form or in the form of small-sized particles is used.

Preferably, via an electrolysis process aluminium is obtained according to the reaction.

$$2Al_2S_3 \rightarrow 4\,Al + 3\,S_2 \qquad (6)$$

Accordingly, the following four main areas of operation can be identified:
the production of carbondisulfide gas from natural gas and sulfur;
the production of aluminiumsulfide from aluminiumoxide and carbondisulfide;
the production of aluminium from aluminiumsulfide;
energy recovery.

Returning now to FIG. 1, with reference number 1, the apparatus for the process for the production of carbondisulfide is indicated.

The preferred process for production of $CS_2$ can be shortly described as follows:

High purity liquid sulfur and natural gas or methane are fed via return line 2 and supply line 3 respectively to a reactor vessel (not shown), preferably an externally fired tube reactor. Via return line 2, also CO and $CS_2$ are fed back from apparatus 5 as will be described later. The gaseous reaction product of this reactor vessel contains $CS_2$, $H_2S$ and $S_2$. This gaseous reaction product is cooled in apparatus 1 to e.g. 150° C. to remove $S_2$ by condensation. The liquid sulfur is returned to the reactor vessel for $CS_2$. After the removal of sulfur a mixture of $CS_2$ and $H_2S$ remains. These two components are separated in an absorber/stripper section of apparatus 1. The stream of $H_2S$ gas is purified, i.e. $CS_2$ remaining in the stream of $H_2S$ gas is removed, prior to entering a conversion unit, preferably a Claus unit where the $H_2S$ is converted into liquid sulfur which is returned to the reactor vessel for $CS_2$ production. In a conventional $CS_2$ production facility the stream of $CS_2$ gas is purified preferably in a set of distillation towers to obtain high purity $CS_2$. In the present invention, such high purity $CS_2$ is not required and consequently, certain purifying steps can be omitted or simplified. The obtained $CS_2$ is fed via supply line 4 to apparatus 5 for the production of $Al_2S_3$ from $Al_2O_3$.

In apparatus 5, alumina supplied via supply line 6 and $CS_2$ supplied via supply line 4 are fed to a $Al_2S_3$ reactor vessel. By-products such as CO, $S_2$ and possibly COS and unreacted $CS_2$ are returned to apparatus 1 via return line 2.

The produced $Al_2S_3$ from apparatus 5 is fed via feedline 7 to apparatus 8. Apparatus 8 preferably comprises an electrolysis cell for the electrolysis of $Al_2S_3$. The resulting aluminium is removed via line 9. Sulfur originating from the electrolysis process is returned via return line 10 to the reactor vessel for $CS_2$ production in apparatus 1.

Steam, generated in the Claus unit and/or CO resulting from processes in apparatus 1 are fed via line 11 to power apparatus 12.

Steam is produced in several locations e.g. the $CS_2$-reactors and the Claus unit. The waste heat exchanger of the Claus unit is the biggest producer and is situated behind the combustion chamber. In this combustion chamber $H_2S$ is (partly) converted to $SO_2$ generating a lot of heat. The gas going to the combustion chamber also contains all the CO that was produced in the sulfidation step, this is burned here to $CO_2$ also generating steam. Power, in any form, such a steam, or electrical power, is available via power outlet 13.

Figure 2:
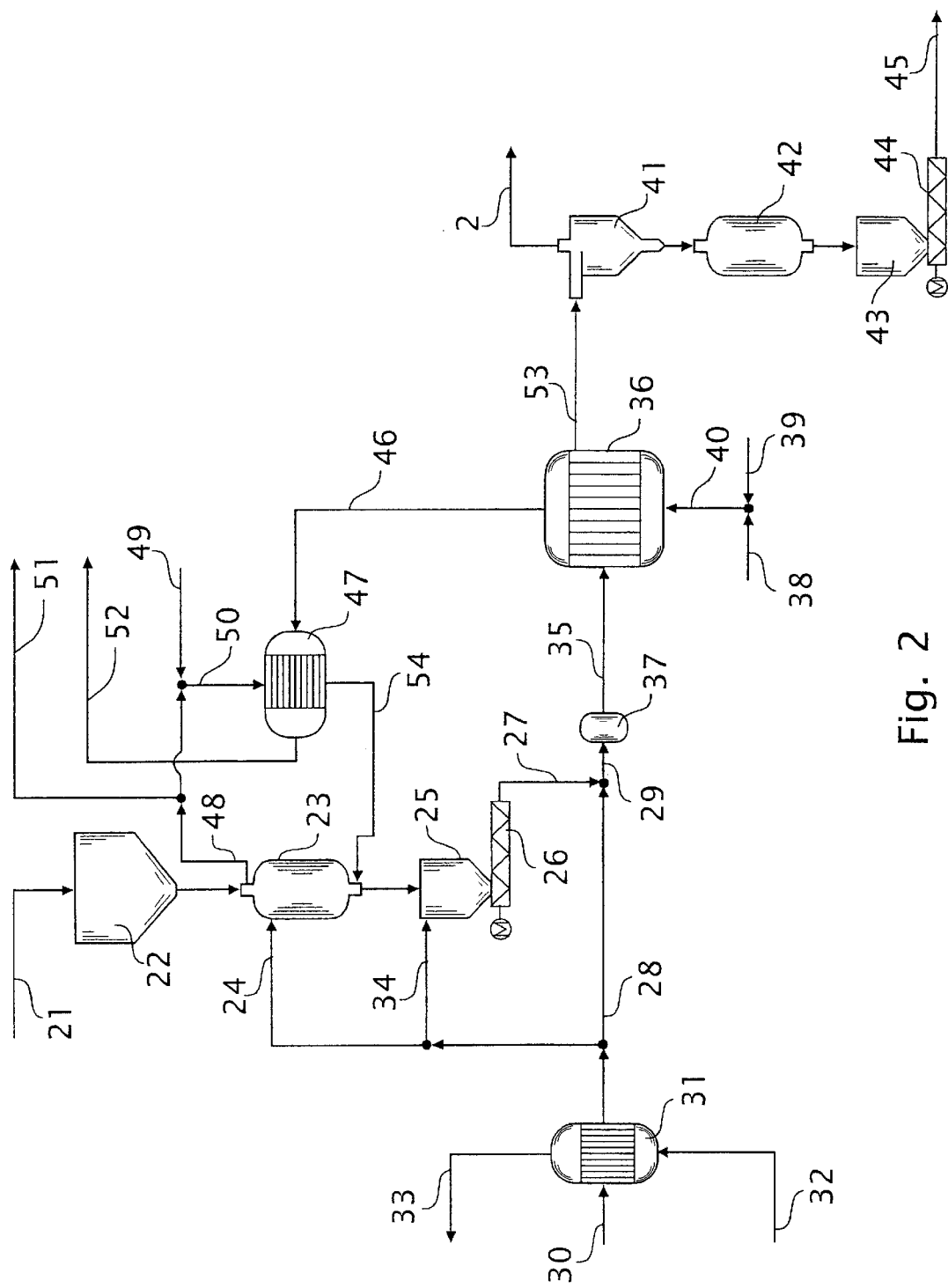
FIG. 2 shows a basic diagram of an apparatus for the production of aluminiumsulfide from alumina and carbonsulfide.

The production of $Al_2S_3$, as performed in apparatus 5 of FIG. 1, will now be illustrated with reference to FIG. 2 which shows a non-limitative example of a process flow diagram.

Alumina arrives via supply line 21 (corresponding to supply line 6 in FIG. 1) as a bulk solid preferably in powder form and is stored in silo's 22. From the silo's 22 alumina is transported to a lock-hopper 23 where it is dried and pre-heated, preferably with nitrogen supplied via supply line 54. After drying and pre-heating the alumina is pressurised with small amount of gas, supplied through pressure line 24, preferably gaseous $CS_2$, to the desired pressure, e.g. 31 Bar is chosen before the alumina is charged to a run lock-hopper 25. Components 22, 23 and 25 together form supply means for alumina. With dosing means 26, such as a dosing screw the pressurized alumina is fed via supply line 27 into the main stream of pre-heated pressurized $CS_2$, supplied through pressure line 28 that can be obtained in the following manner.

The $CS_2$ as produced in apparatus 1 of FIG. 1, is pressurized to 30 Bar with a pump (not shown) before entering through line 30 (corresponding to supply line 4 in FIG. 1) into the $CS_2$ preheater 31 where $CS_2$ is vaporized and heated to about 200° C. or higher preferably by condensing high pressure steam supplied through line 32 which was produced in the furnace of the Claus unit as described above. The condensate is removed via line 33. A small side stream of this pressurized, heated $CS_2$ stream can be used for the injection of alumina through lines 24 and 34.

When the alumina and the $CS_2$ are mixed the gas/solid mixture is fed via lines 29 and 35 to the sulfidation reactor 36. The gas/solid mixture may be split e.g. into nine separate parts with a so called pepper-box 37 prior to entering the sulfidation reactor or reactors. The sulfidation reactor is preferably an externally fired tube reactor, like the $CS_2$ reactor vessel of the apparatus in FIG. 1, preferably operated with a operating temperature of about 850° C. and pressure of about 30 Bar. The gas/solid mixture goes through pipes that are heated in a furnace by natural gas burners. Gas and air are supplied via lines 38, 39 and finally 40.

The reaction products (gasses and solids) are separated in a set of two high temperature cyclones 41, supplied thereto through line 53. The gas coming from the cyclones (containing unreacted $CS_2$, CO, $S_2$ and possibly COS) is recycled to the gas treating section of apparatus 1 of FIG. 1 and fed thereto through return line 2. The solid aluminiumsulfide is depressurized in a lock-hopper 42 and sent to a run lock-hopper 43. With a dosing screw 44 the aluminiumsulfide is fed to an intermediate storage silo (not shown) via line 45. As mentioned before it is also possible to choose the operating conditions of the sulfidation reactor 36 such that a liquid $Al_2S_3$ is obtained. The liquid $Al_2S_3$ may be solidified or may be fed in liquid form into the next process step, such as an electrolysis step.

The off-gas of the sulfidation reactor 36 (i.e. the flue gas of the natural gas burners) can be transported through line 46 to a heat-exchanger 47 and used to heat up gas used for pre-heating and drying, in this case nitrogen. This hot nitrogen is used in a closed loop to dry and pre-heat the alumina in the lock-hopper 23, and fed back to the heat-exchanger through line 48. Make-up nitrogen is supplied through line 49. Fed-back and make-up nitrogen enter heat-exchanger 47 through line 50. A small bleed, removed via line 51, and some make-up nitrogen is needed in this loop to remove vapour from the recycle stream. The off-gas is removed via line 52.

A series of experiments were performed to test the sulfidation step. In these experiments a sample of γ-alumina (250 $\mu$m–500 $\mu$m) was contacted with a mixture of vaporised $CS_2$ and argon gas. Each experiment was characterised by a different temperature or pressure. The following temperatures were tested: 750° C, 900° C. and above 1000° C. Also, the pressure was varied from 9 Bars to 20 Bars. The reaction rate was followed by off-gas analysis with a continuous Fourier Transform InfraRed gas analyser. During these experiments the following phenomena were observed: increasing the reaction temperature results in an increased reaction rate, an increased pressure also results in an increased reaction rate and a temperature above 1000° C. results in an less fast conversion than could be expected from extrapolating from the other temperature steps. The main reaction products were sulfur vapour, CO (gas), COS (gas) and aluminiumsulfide (solid). Typical reaction times for a 40% conversion ranged from 1 hr to 30 minutes with increased temperature and pressure.

The production of aluminium from aluminiumsulfide will be discussed in the following.

It is possible to produce aluminium from $Al_2S_3$ through disproportionation making use of the fact that $Al_2S_3$ is not stable at high temperatures. The preferred embodiment of the present invention is an electrolysis process. This process step will be illustrated with reference to a non-limitative embodiment of an electrolysis process.

The electrolysis of $Al_2S_3$ is performed in molten fluoride salts or in molten chloride salts in a preferred temperature range of 700–1000° C.

The advantages of electrolysis per se, and in particular over the established Hall-Heroult process are the following:

Fundamentally the required voltage (0.98 V) for the electrolysis is much lower compared to the classis Hall-Heroult process (1.82 V).

No chlorine or fluor gas is released from the electrolysis cell.

The generated sulfur $S_2$ does not readily attack carbon (at the temperature and pressure of the electrolysis process no $CS_2$ gas is formed).

The generated sulfur can be used for the production of $CS_2$ and thus for the sulfidation of $Al_2O_3$ to $Al_2S_3$ through reaction (1).

This means that also a multi-polar electrolysis cell is possible using (non-consumable) graphite electrodes. Increasing the current density is also very well possible, at the cost of a lower energy efficiency due to the electrical resistance of the melt. Still, the result would be an electrolysis plant with a much smaller footprint.

As in illustration of the electrolysis process, reference is made to an investigation by Minh, who produced aluminium in laboratory scale electrolysis of 5 wt.% $Al_2S_3$ in $MgCl_2$—NaCl—KCl eutectic (with 10 wt.%$AlCl_3$) at 750° C. using graphite electrodes (3 cm anode-cathode distance). A current efficiency (CE) of approx. 80% was obtained at current densities ranging from 0,2 to 1,2 A/cm$^2$.

The voltage drop but not the CE is given for current densities up to 2.0 A/cm$^2$. Interpreting these data, allowing for voltage drops across external connections etc., the power consumption per kg aluminium was calculated (assuming CE=80% in all cases). The results are presented in the table below.

| | 3 cm anode - cathode | | 2 cm anode - cathode | |
|---|---|---|---|---|
| current density A/cm$^2$ | total voltage per cell V | DC Power consumption kWh/kg | total voltage per cell V | DC Power consumption kWh/kg |
| 0.8 (Hall Heroult) | 2.92 | 10.9 | 2.38 | 8.9 |
| 1.2 | 4.03 | 15.0 | 3.32 | 12.0 |
| 2.0 | 5.79 | 21.6 | 4.45 | 16.5 |

A current density of 0.8 A/cm$^2$ is a common value in the Hall-Heroult process.

Alternatively liquid $Al_2S_3$ can be electrolysed directly (i.e. $Al_2S_3$ being the most abundant single component in the melt), with or without the use of membranes. The most important potential of this alternative is that small interelectrode space is possible (no lack of feedstock between the electrodes).

In summary, the present invention offers the following advantages.

The operational costs are 30% lower for the CAPP process when compared to the Hall-Heroult process.

The environmental performance of the CAPP process is excellent while it eliminates the emission of fluorides, $CF_4$ and $C_2F_6$ (notorious green house gasses), heavy metals and CO completely. Emissions of $CO_2$ and $SO_2$ are substantially reduced (55% and 35% respectively) when compared with the Hall-Heroult process.

The use of electric power is 85% lower for the CAPP process when compared with the Hall-Heroult process.

Next to economical and environmental benefits the CAPP process offers and improvement of the working conditions. Only closed systems are used reducing the exposure of the workers to hazardous components.

With the invention it is possible to economically produce aluminium in an environmentally safe way, thereby obtaining the advantages mentioned above.

What is claimed is:

1. A method for the production of primary aluminium from technically pure alumina comprising the step of converting alumina into aluminium sulfide ($Al_2S_3$) and subsequently the separation of aluminium from aluminium sulfide, wherein the conversion of alumina into aluminium sulfide is performed by reacting alumina with an essentially gaseous $CS_2$ gas containing reactant at a temperature $T_{al}$ wherein the alumina is mainly γ-alumina.

2. The method according to claim 1, wherein the temperature $T_{al}$ is lower than 1100° C.

3. The method according to claim 1 wherein the temperature $T_{al}$ is higher than 700° C.

4. The method according to claim 1, wherein the conversion of alumina into aluminium sulfide is performed at a conversion pressure higher than 1 Bar absolute pressure.

5. The method according to claim 4, wherein the conversion pressure is higher than 5 Bar absolute pressure.

6. The method according to claim 4, wherein the conversion pressure is higher than 15 Bar absolute pressure.

7. The method according to claim 1, wherein the aluminium sulfide is at least partly heated to a temperature over its melting temperature.

8. The method according to claim 7, wherein melted aluminium sulfide is cooled so as to form small-sized grains, having an average grain size smaller than the average grain size of the aluminium sulfide prior to being heated.

9. The method according to claim 1, wherein the $CS_2$ is formed from sulfur and a carbonaceous reactant.

10. The method according to claim 9, wherein the carbonaceous reactant comprises methane or natural gas.

11. The method according to claim 9, wherein unreacted sulfur in the production of $CS_2$ is removed, and returned for the production of $CS_2$.

12. The method according to claim 9, wherein hydrogen sulfide ($H_2S$) formed in the production of $CS_2$ is removed and converted to form sulfur which sulfur is returned for the production of $CS_2$.

13. The method according to claim 9, wherein the carbonaceous reactant contains mainly methane or natural gas.

14. The method according to claim 9, wherein unreacted sulfur in the production of $CS_2$ is removed by condensation, and returned for the production of $CS_2$.

15. The method according to claim 1, wherein the $CS_2$ is formed essentially from sulfur of which a mainstream results from at least one step selected from the group consisting of sulfur from the separation of the aluminium sulfide into aluminium and sulfur from the conversion of alumina into aluminium sulfide.

16. The method according to claim 1, wherein prior to the conversion of alumina into aluminium sulfide, via sulfidation, the alumina is dried and pressurized, whereupon the sulfidation is performed by passing a gas-solid mixture containing gaseous $CS_2$ and solid alumina through a reactor, whereupon the solids are separated and the gas is further treated for separating unreacted $CS_2$ and at least one by-product selected from the group consisting of CO, COS and $S_2$, at least one of said at least one by-product is fed back into the process for the production of $CS_2$.

17. The method according to claim 1, wherein the $CS_2$ containing gas is formed and essentially fed directly, without intermediate storage, to a reactor vessel to react with alumina to form aluminium sulfide.

18. The method according to claim 1, wherein the $CS_2$ containing gas is essentially $CS_2$.

19. The method according to claim 1, wherein the separation of aluminium from aluminium sulfide is performed by electrolysis.

20. The method according to claim 19, wherein the electrolysis is performed in a multi-polar electrolysis.

21. The method according to claim 19, wherein the electrolysis is performed directly in a bath of molten aluminium sulfide.

22. The method according to claim 1, wherein the temperature $T_{al}$ is lower than 1025° C.

23. The method according to claim 22, wherein the conversion of alumina into aluminium sulfide is performed at a conversion pressure higher than 1 Bar absolute pressure.

24. The method according to claim 22, wherein the aluminium sulfide is at least partly heated to a temperature over its melting temperature.

25. The method to claim 22, wherein the $CS_2$ is formed from sulfur and a carbonaceous reactant.

26. The method according to claim 22, wherein the $CS_2$ is formed essentially from sulfur of which a mainstream results from at least one step selected from the group consisting of sulfur from the separation of the aluminium sulfide into aluminium and sulfur from the conversion of alumina into aluminium sulfide.

27. The method according to claim 1, wherein the temperature $T_{al}$ is lower than 1000° C.

28. The method according to claim 1, wherein the temperature $T_{al}$ is higher than 750° C.

29. The method according to claim 1, wherein prior to the conversion of alumina into aluminium sulfide, via sulfidation, the alumina is dried and pressurized, whereupon the sulfidation is performed by passing a gas-solid mixture containing gaseous $CS_2$ and solid alumina through a reactor at a temperature of between 800° C. and 900° C. and at a pressure of between 5 and 35 Bar, whereupon the solids are separated and the gas is further treated for separating unreacted $CS_2$ and at least one by-product selected from the group consisting of CO, COS and $S_2$, at least one of said at least one by-product is fed back into the process for the production of $CS_2$.

30. An apparatus for producing primary aluminium from alumina, comprising:
    a first reactor for manufacturing $CS_2$;
    a second reactor for manufacturing $Al_2S_3$ from $CS_2$ and $Al_2O_3$ by reacting $Al_2O_3$ with an essentially gaseous $CS_2$ gas containing reactant at a temperature $T_{al}$ wherein the alumina is mainly γ-alumina; and
    a third reactor for manufacturing Al from $Al_2S_3$.

31. The apparatus of claim 30, wherein said third reactor is an electrolysis cell.

* * * * *